(12) United States Patent
Chitturi et al.

(10) Patent No.: US 6,489,932 B1
(45) Date of Patent: Dec. 3, 2002

(54) DISPLAY DEVICE INCLUDING AN INTEGRAL DOCKING STATION FOR A PALM SIZED COMPUTING DEVICE

(75) Inventors: Prasanna R. Chitturi, 7430 Laurel Ct., Pleasanton, CA (US) 94588; Sushil Shah, 6355 Paseo Santa Maria, Pleasanton, CA (US) 94566

(73) Assignees: Prasanna R. Chitturi, Pleasanton, CA (US); Sushil Shah, Pleasanton, CA (US)

( * ) Notice: Subject to any disclaimer, the term of this patent is extended or adjusted under 35 U.S.C. 154(b) by 0 days.

(21) Appl. No.: 09/410,482

(22) Filed: Sep. 30, 1999

(51) Int. Cl.[7] .................................................. G09G 5/00
(52) U.S. Cl. ........................ 345/1; 345/173; 345/903; 345/905; 439/131; 439/929; 361/727; 361/683; 395/281
(58) Field of Search ............................ 345/1, 903, 905, 345/173, 158; 439/131, 929; 361/727, 683; 395/281, 308, 893

(56) References Cited

U.S. PATENT DOCUMENTS 5,689,654 A * 11/1997 Kikinis et al. .............. 345/173
6,049,453 A * 4/2000 Hulsebosch ................ 361/686
6,163,326 A * 4/2000 Klein et al. ................ 345/168
6,309,230 B2 * 10/2001 Helot ......................... 439/131

* cited by examiner

Primary Examiner—Richard Hjerpe
Assistant Examiner—Ali Zamani
(74) Attorney, Agent, or Firm—Schwabe, Williamson & Wyatt, P.C.

(57) ABSTRACT

A display device having an integral docking station to facilitate the display device to be used in conjunction with a palm sized computing device for applications executing on the palm sized computing device is disclosed. The display device includes a flat panel display, a display controller, a microcontroller, a docking station including a communication interface, and a chassis integrally housing the earlier enumerated elements. Together, the enumerated elements facilitate removable coupling of the palm sized computing device to the display device to allow the flat panel display to be used in conjunction with said palm sized computing device under the control of said microcontroller for applications executing on said palm sized computing device. In various embodiments, the display device additionally includes at least a selected one of a number of other I/O peripherals. In other embodiments, other extended I/O capabilities, such as storage media, keyboard and cursor control are also provided. In yet other embodiments, the I/O extending apparatus is included as an integral feature of an article of manufacture, such as a furnishing item.

14 Claims, 9 Drawing Sheets

US 6,489,932 B1

DISPLAY DEVICE INCLUDING AN INTEGRAL DOCKING STATION FOR A PALM SIZED COMPUTING DEVICE

BACKGROUND OF THE INVENTION

1. Field of the Invention

The present invention relates to the field of digital computing devices. More specifically, the present invention relates to the coupling of a palm sized computing device having a relatively small integral display to a larger display device.

2. Background Information

Advances in microprocessor technology have led to the birth and increasing popularity of palm sized computing devices. Examples of palm sized computing devices include but not limited to the famous Palm series available from 3COM Inc of San Jose, Calif., Nino from Philips of the Netherlands, and Cassiopeia from Casio of. A hallmark feature of these devices is their compactness. Most of these devices are sufficiently small to be carried in one's shirt pocket. However, the compactness does come with a price in that it limits the power of the processor, the amount of storage capacity, the size of the display screen, as well as the type of input devices that may be employed with these compact palm sized computing devices. As a result, the earlier generation of these devices typically come with limited processor power and storage capacity, as well as a small display screen, and a stylus is employed for providing user inputs. Thus, the earlier applications were limited to basic applications, such as calendar and address book applications. The typical continuous duration of usage of these devices was not very long. Occasionally, there are situations, such as bulk entry, do require prolonged working with the data. To address this need or the input/output shortcoming of these devices, most applications may also be executed on personal computers having greater power and storage capacity, larger display screens and conventional keyboard and cursor control devices. The palm sized computing devices would be provided with a mechanism to attach themselves to the personal computers to facilitate synchronization of the data. The mechanism is typically in the form of a separate cradle unit having a parallel interface to the personal computer.

Over the years, palm sized computing devices have become more powerful, and increasingly, they are equipped with more data storage capacity. As a result, a wide variety of more sophisticated applications, well beyond the original basic calendar and address book applications, may be made available on these palm sized computing devices. Either because of the volume of data or the inherent nature of these more sophisticated applications themselves, the continuous duration of usage is expected to be much longer than the first generation basic applications. However, the small display screen size and the employment of a stylus for use inputs remain an immutable and limiting characteristic of these devices. As a result, a need exist to provide the users of these computing devices with a more comfortable way of using these devices for a longer duration, to enable these more powerful and greater capacity palm sized computing devices to be used for more sophisticated applications directly.

SUMMARY OF THE INVENTION

The present invention is a display device having an integral docking station to facilitate the display device to be used in conjunction with a palm sized computing device for applications executing on the palm sized computing device. The display device includes a flat panel display, a display controller, a microcontroller, a docking station including a communication interface, and a chassis integrally housing the earlier enumerated elements. Together, the enumerated elements facilitate removable coupling of the palm sized computing device to the display device to allow the flat panel display to be used in conjunction with said palm sized computing device under the control of said microcontroller for applications executing on said palm sized computing device. In other embodiments, other extended I/O capabilities, such as storage media, keyboard and cursor control are also provided. In yet other embodiments, the display devcie is included as an integral feature of an article of manufacture, such as a furnishing item.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention. The phrase "in one embodiment" will be used repeatedly. It generally does not refer to the same embodiment, although it may.

Figure 1:
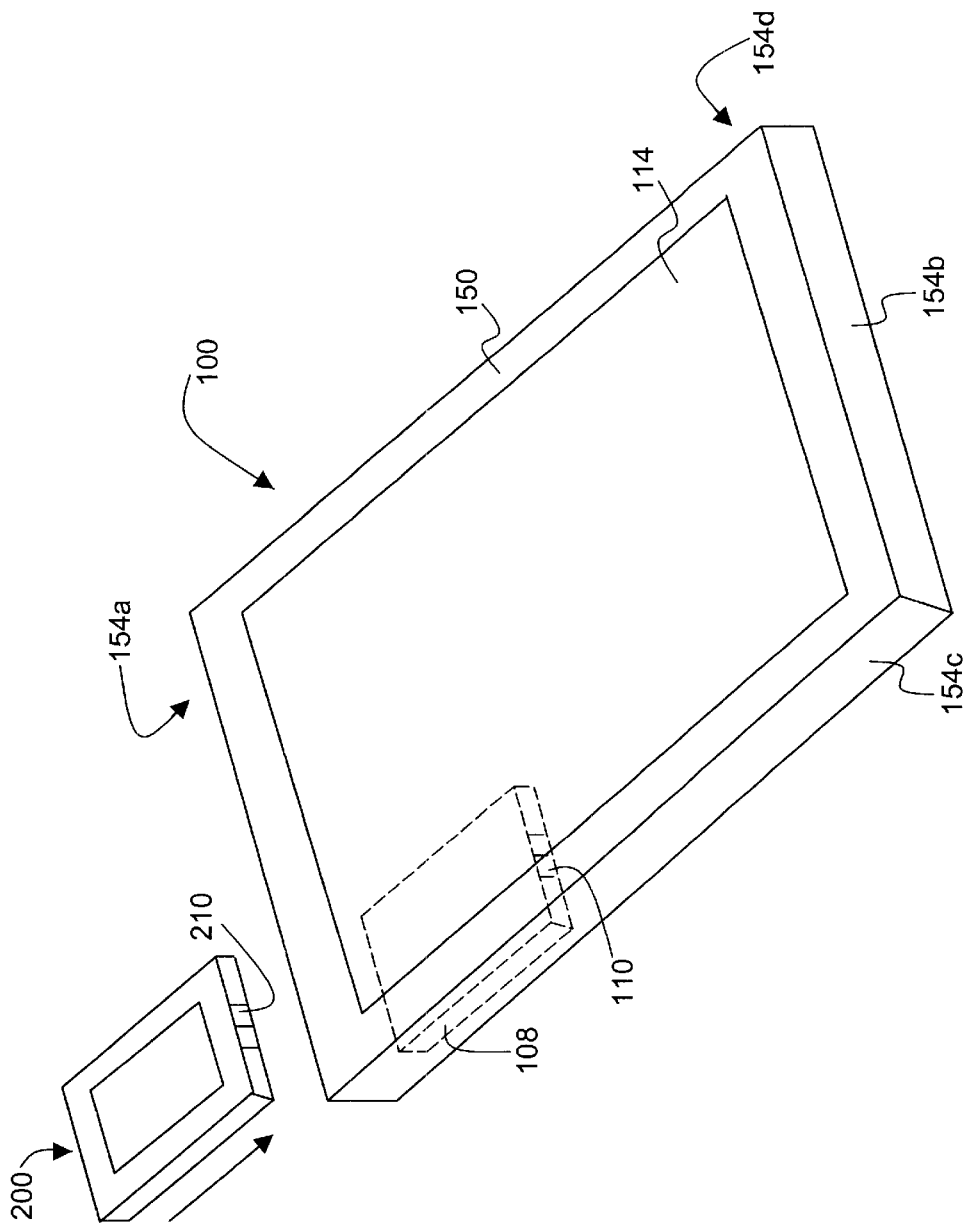
FIG. 1 illustrates a perspective view of the display device of the present invention in accordance with one embodiment.

Referring now to FIG. 1, wherein a perspective view of the display device of the present invention in accordance with one embodiment is shown. As illustrated, for the embodiment of FIG. 1, display device 100 of the present invention is advantageously provided with integrally housed docking station 108 to allow palm sized computing device 200 to be removably coupled to display device 100 in an easy slip in manner. Once coupled, display device 100 may be used in conjunction with palm sized computing device 200 for applications 208 executing on palm sized computing device 200 (hereinafter simply computing device) to provide a user with a more comfortable experience in working with applications 208.

Figure 2:
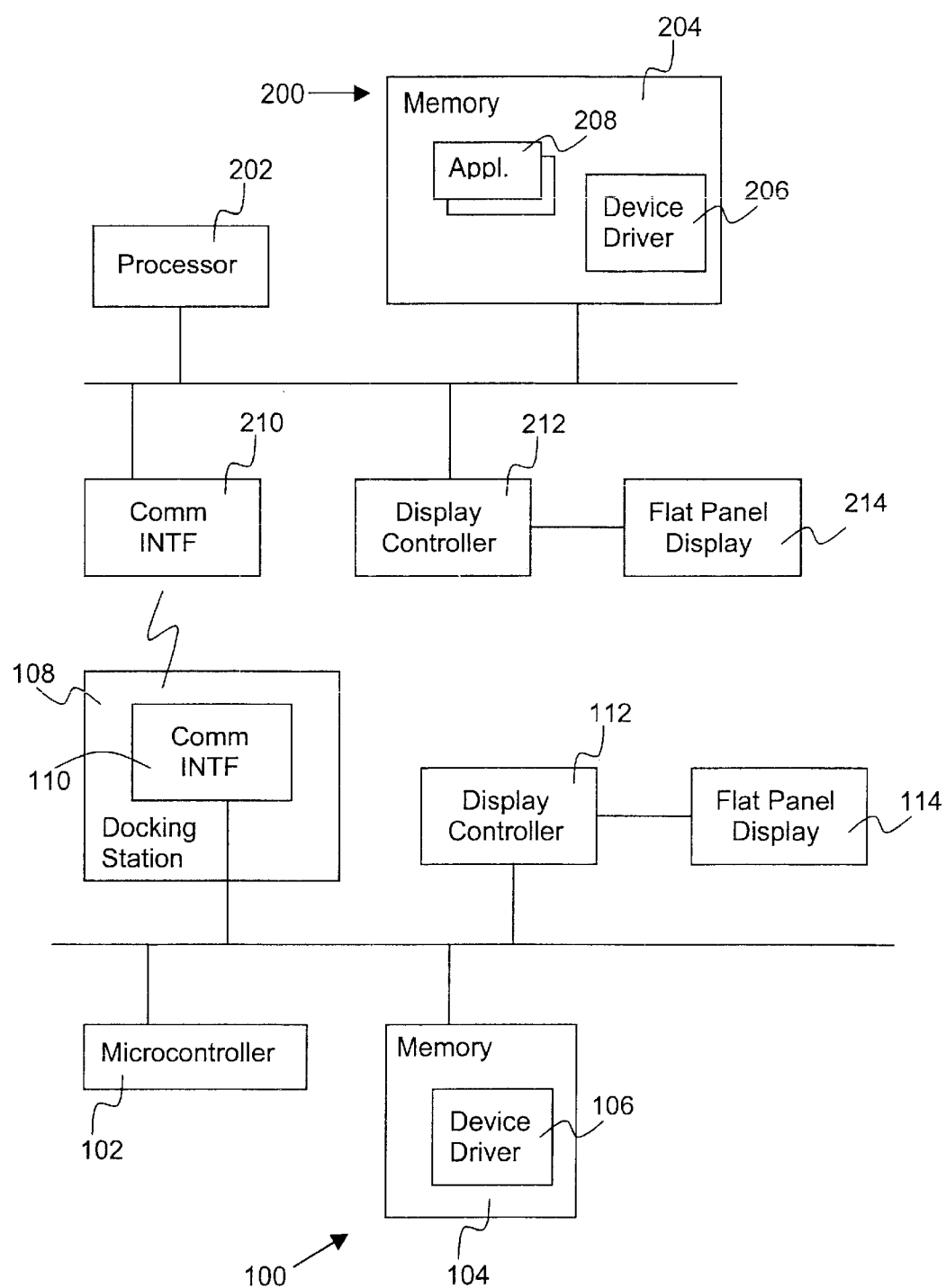
FIG. 2 illustrates an architectural view of the display device and a removably coupled palm sized computing device, in accordance with one embodiment each.
Figure 10A:
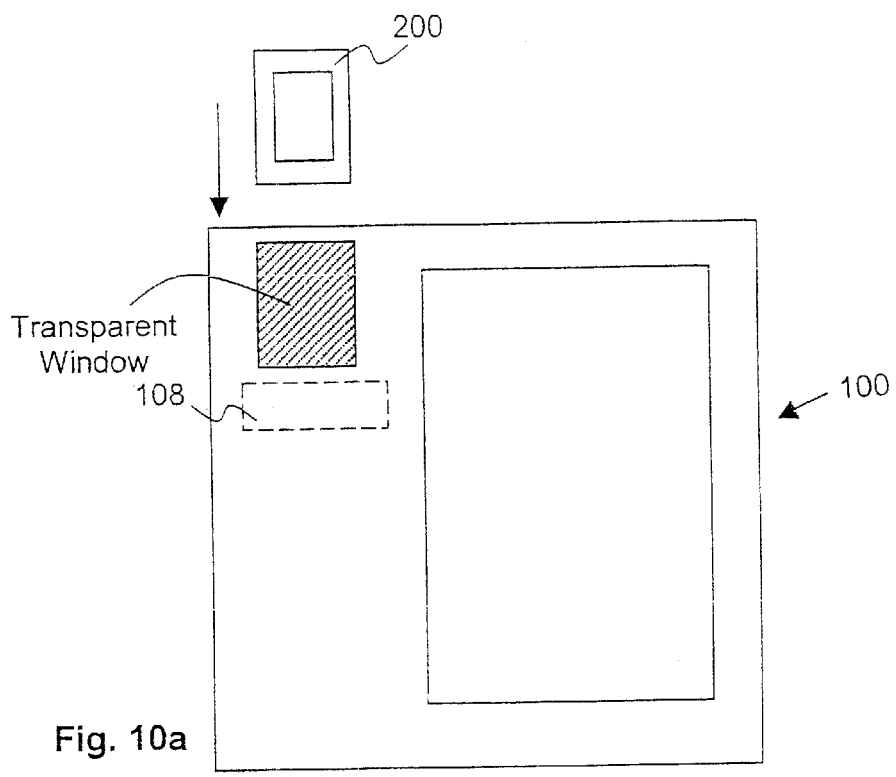
FIGS. 10a–10b illustrate couple of variants of the embodiment of FIG. 1.
Figure 10B:
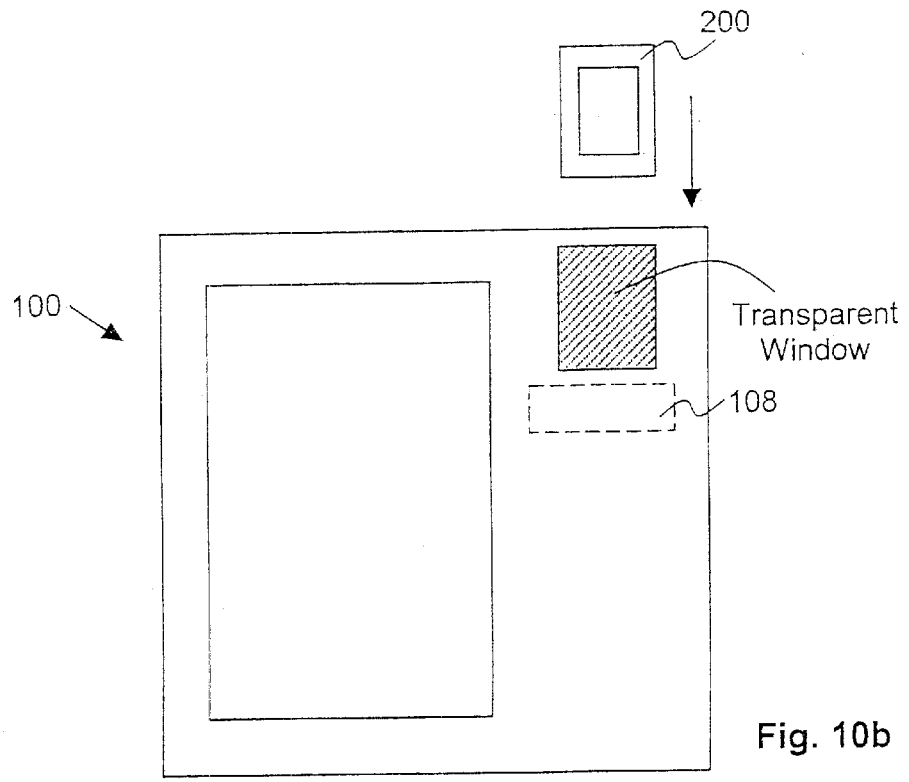

Referring now also to FIG. 2, wherein an architectural view of the display device of FIG. 1, i.e. display device 100, and computing device 200 in accordance with one embodiment each is shown. As illustrated, docking station 108 of display device 100 includes communication interface 110. Display device 100, in addition to docking station 108 having communication interface 110, further includes microcontroller 102, memory 104, display controller 112, and flat panel display 114 coupled to each other and communication interface 110 as shown. Memory 104 includes device driver 106. Elements 102–106 and 108–114 are integrally housed by chassis 150. For the illustrated embodiment, chassis 150 has a form factor of a tablet, and flat panel display 114 is disposed on a front surface of chassis 150. Docking station 108 is internally disposed, and exposed through opening 152 disposed at top side wall 154a of chassis 150. In alternate embodiments, internally disposed docking station 108 may be exposed through an opening disposed at the bottom, left or right side wall 154b, 154c, or 154d instead. In yet other embodiments, while docking station 108 may be internally disposed, the display of computing device 200 may be made visible through a transparent window (see FIG. 10a and 10b). In any of these embodiments, display device 100 may in turn be integrally packaged with other furnishing items, e.g. a student's desk, a doctor's examination station, and so forth. Computing device 202 includes processor 202, memory 204, communication interface 210, display controller 212, and flat panel display 214, coupled to each other as shown. Memory 204, in addition to applications 208, includes device driver 206.

Display controllers 112 and 212 control the operation of flat panel displays 114 and 214 respectively. Microcontroller 108 and processor 202, executing device drivers 106 and 206, control overall operation of display device 100 and computing device 200 respectively, including cooperation of the two devices (through communication interfaces 110 and 210), to allow outputs of applications 208 to be displayed on flat panel display 114. For the illustrated embodiment, the outputs are additionally displayed, i.e. in addition to their display on flat panel display 214. In alternate embodiments, display controller 212 may include a programmable switch to allow device driver 206 to shut off rendering of outputs of applications 208, when cooperating with device driver 106 to render the outputs on flat panel display 114.

Except for the operations of device drivers 106 and 206, elements 102–104, 110–114, 202–204, and 210–214 individually are all intended to represent a broad range and configuration of these elements known in the art.

Figure 3A:
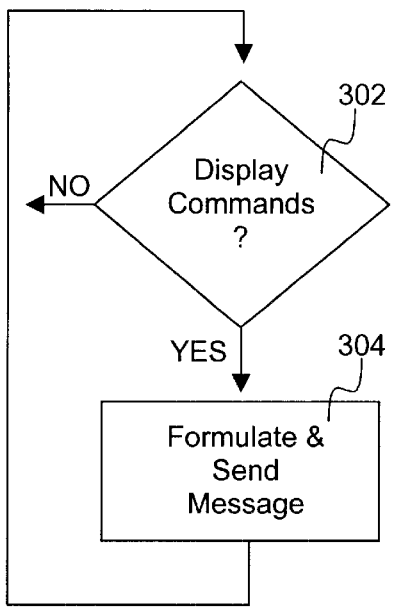
FIGS. 3a–3b illustrate the operational flow of the device drivers of FIG. 2 in accordance with one embodiment.
Figure 3B:
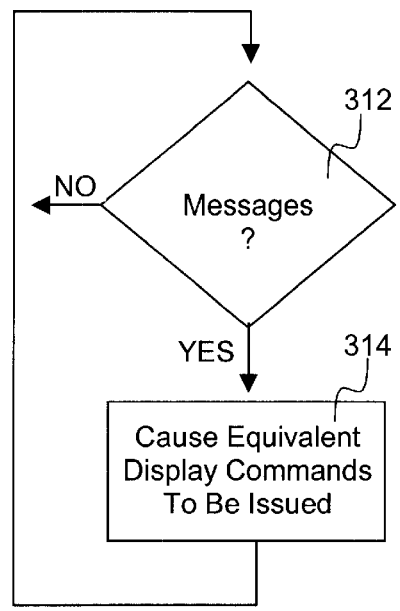

FIGS. 3a–3b illustrate the operational flow of device drivers 206 and 106 of FIG. 2, in accordance with one embodiment each. As illustrated in FIG. 3a, at 302, device driver 206 monitors rendering commands issued by processor 202 for display controller 212. Upon detection, at 304, device driver 206 formulates and transmits a message to device driver 106 informing device driver 106 of the content of the display to be rendered (optionally, including the commands and parameters, if any, issued by processor 202). Over in display device 100, as illustrated by FIG. 3b, at 312, device driver 106 awaits for messages from device driver 206. Upon receipt, at 314, device driver 106 causes microcontroller 102 to issue equivalent commands to display controller 112 to cause the appropriate content to be rendered on flat panel display 114.

For the illustrated embodiment, flat panel display 114 is a touch sensitive display that can be used to facilitate provision of user inputs to computing device 200, when used in conjunction with display device 100. Display controller 112 is further equipped with logic to facilitate such provision of user inputs.

Figure 4A:
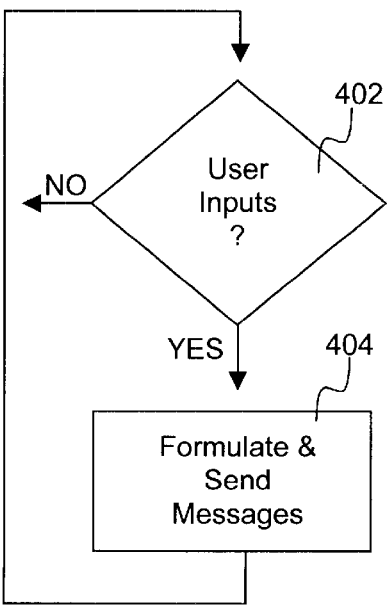
FIGS. 4a–4b illustrate further operational flow of the device drivers of FIG. 2 in accordance with another embodiment.
Figure 4B:
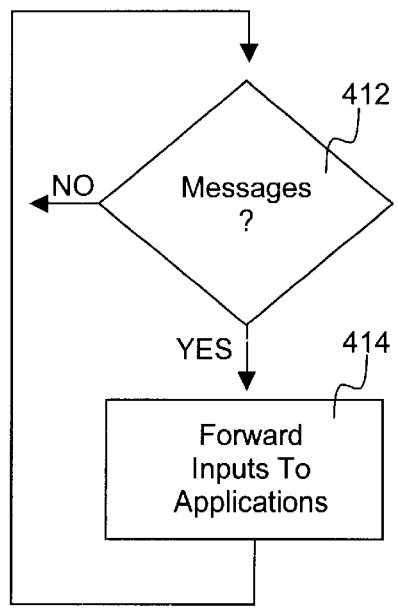

FIGS. 4a–4b illustrate further operational flow of device drivers 206 and 106 of FIG. 2, in accordance with one embodiment each. As illustrated in FIG. 4a, at 402, device driver 106 monitors for user inputs entered through touch sensitive flat panel display 114. Upon detection, at 404, device driver 106 formulates and transmits a message to device driver 206 informing device driver 206 of the user inputs entered. Over in computing device 200, as illustrated by FIG. 4b, at 412, device driver 206 awaits for messages from device driver 106. Upon receipt, at 414, device driver 206 forwards the received inputs to applications 208 for processing.

Referring back to FIG. 1, although not illustrated in scale, it can be seen that flat panel display 114 of display device 110 of the present invention is physically larger than flat panel display 214 of computing device 200. Accordingly, it can be seen, from the foregoing description, a user will be more comfortable working with applications executing on computing device 200 that involve a larger volume of data or for a longer continuous duration, through display device 100 of the present invention. Additionally, the user maintains the flexibility and freedom to retain all applications and data on the smaller form factor computing device 200.

Figure 5:
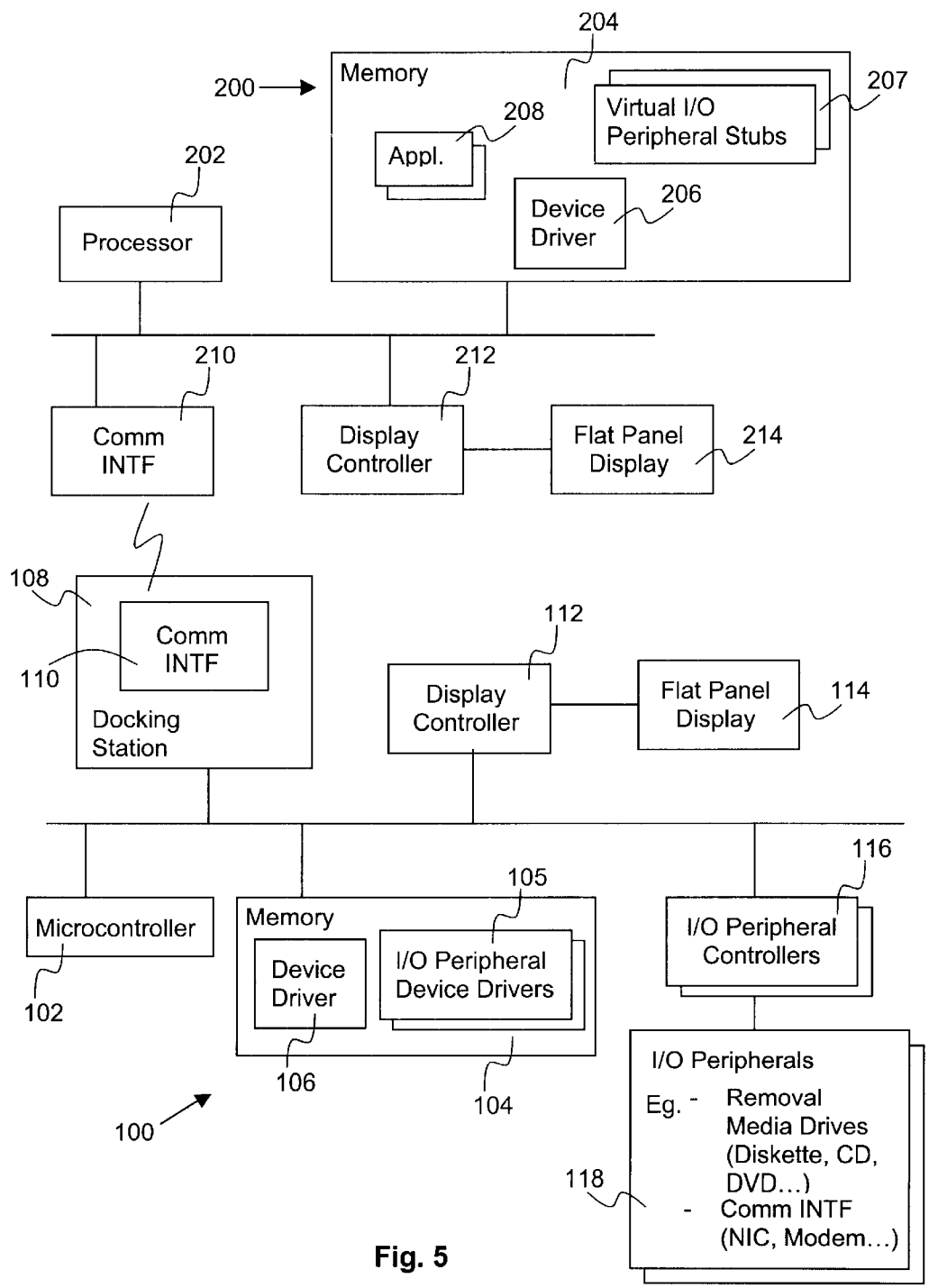
FIG. 5 illustrates an architectural view of the display device and a removably coupled palm sized computing device, in accordance with another embodiment each.

FIG. 5 illustrates an architectural view of display device 100' and computing device 200' in accordance with another embodiment each. As illustrated, display device 100' is similarly constituted as display device 100, except display device 100' is further provided with I/O peripheral controller (s) 116, I/O peripheral(s) 118, and corresponding device driver(s) 105. During operation, device driver(s) 105 correspondingly control operations of I/O peripheral(s) 118 through controller(s) 116. I/O peripheral controller(s) 116 and I/O peripheral(s) 118 may be one or more of a number of known removable media storage device controller and device pairs known in the art. Examples of such controller and device pairs include but not limited to diskette drive controller and diskette drive, CDROM drive controller and CDROM drive, and DVD drive controller and DVD drive. In the cases of CDROM and DVD drives, I/O peripheral(s) 118 may further include one or more speakers. The speakers may be controlled by the CDROM/DVD controller, or their own controller. I/O peripheral controller(s) 116 and I/O peripheral(s) 118 may also be one or more of a number of known wireline or wireless communication interfaces known in the art, to allow applications executing on computing device 200' to access remote data, e.g. from a web site, through display device 100'. Examples of such wireline or wireless communication interfaces include but not limited to network controllers, wireline and wireless modems or adapters, and the like.

Computing device 200' is similarly constituted as computing device 200, except computing device 200' is further provided with corresponding virtual I/O peripheral device driver stub(s) 207. Applications 208 needing access to one of I/O peripheral(s) 118 call a corresponding one of virtual I/O peripheral device driver stub(s) 207 as if it is an actual device driver corresponding to an actual I/O peripheral of computing device 200'. Virtual I/O peripheral device driver stub(s) 207 redirects these service calls to device driver 206 for processing.

Figure 6A:
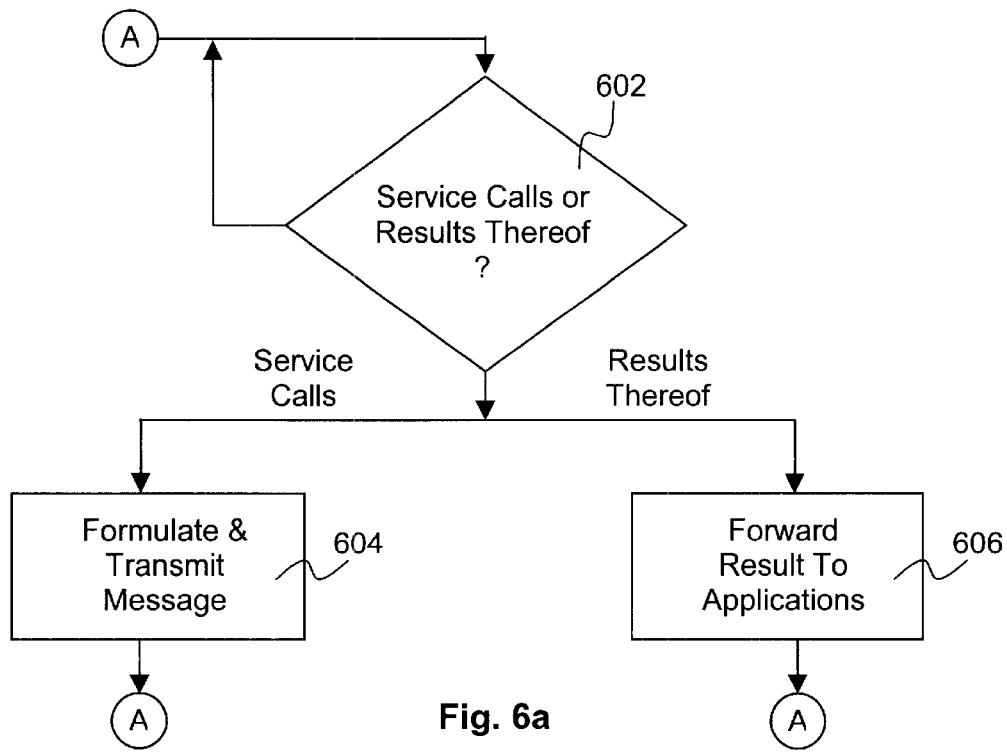
FIGS. 6a–6b illustrate the operational flow of the device drivers of FIG. 5 in accordance with one embodiment.
Figure 6B:
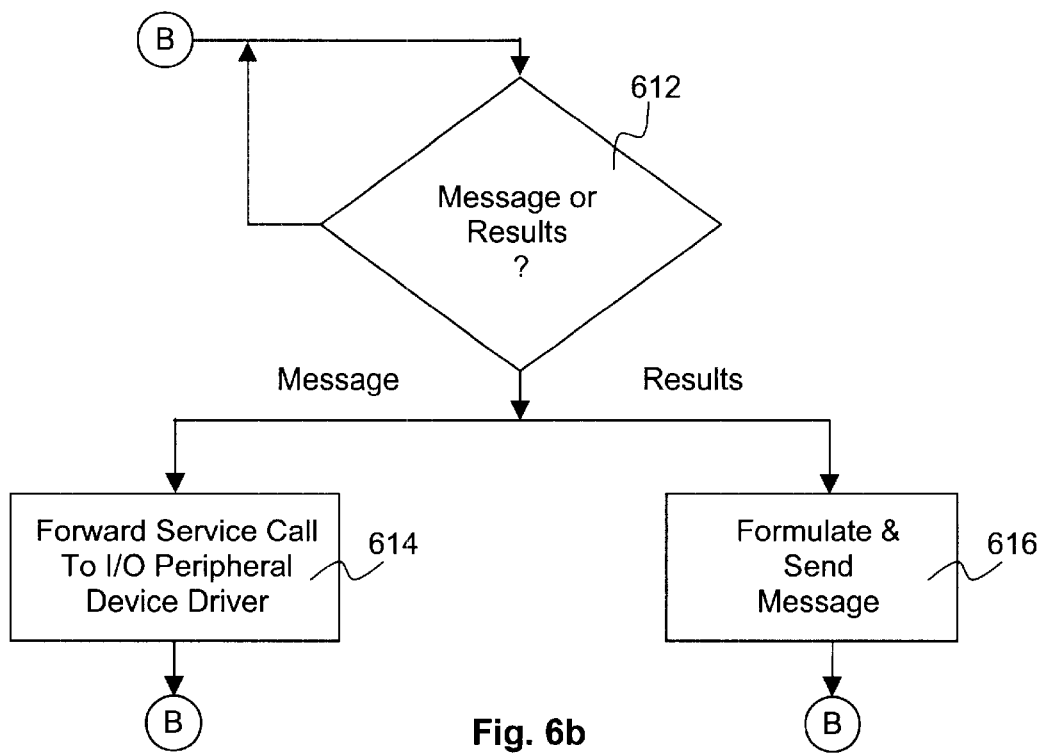

FIGS. 6a–6b illustrate the further operational flow of device drivers 206 and 106 of FIG. 4, in accordance with one embodiment each. As illustrated in FIG. 6a, at 602, device driver 206 monitors for service calls redirected from virtual I/O peripheral stub(s) 207 as well as results to redirected service calls return from device driver 106. Upon detection of the former, at 604, device driver 206 formulates and transmits a message to device driver 106 informing device driver 106 of the service call (including the call parameters, if any), if computing device 200' is coupled to display device 100'. Otherwise, device driver 206 returns an error to applications 208. On the other hand, if the latter was detected instead, at 606, device driver 206 forwards the returned results to an appropriate one of applications 208. Over in display device 100', as illustrated by FIG. 6b, at 612, device driver 106 awaits for messages from device driver 206 or results to service calls from I/O peripheral driver(s) 105. Upon receipt of the former, at 614, device driver 106 forwards the service call (including the call parameters, if any) to an appropriate one of I/O peripheral driver(s) 105 for processing. On the other hand, if the latter was detected instead, at 616, device driver 106 formulates and transmits a message to device driver 106 informing device driver 206 of the results of the service call.

Accordingly, it can be seen, from the foregoing description, a user may be provided with even a more richer experience, working with applications executing on computing device 200' that access data and/or use I/O peripherals otherwise not available on computing device 200', through display device 100' of the present invention. An example usage of display device 100' is to transform a user's computing device 200' into e.g. an e-book, thereby eliminating the need for the user to own and pay the full cost of both devices, while allowing the user to maintain the flexibility and freedom to keep a number of applications and data on the smaller form factor computing device.

Figure 7:
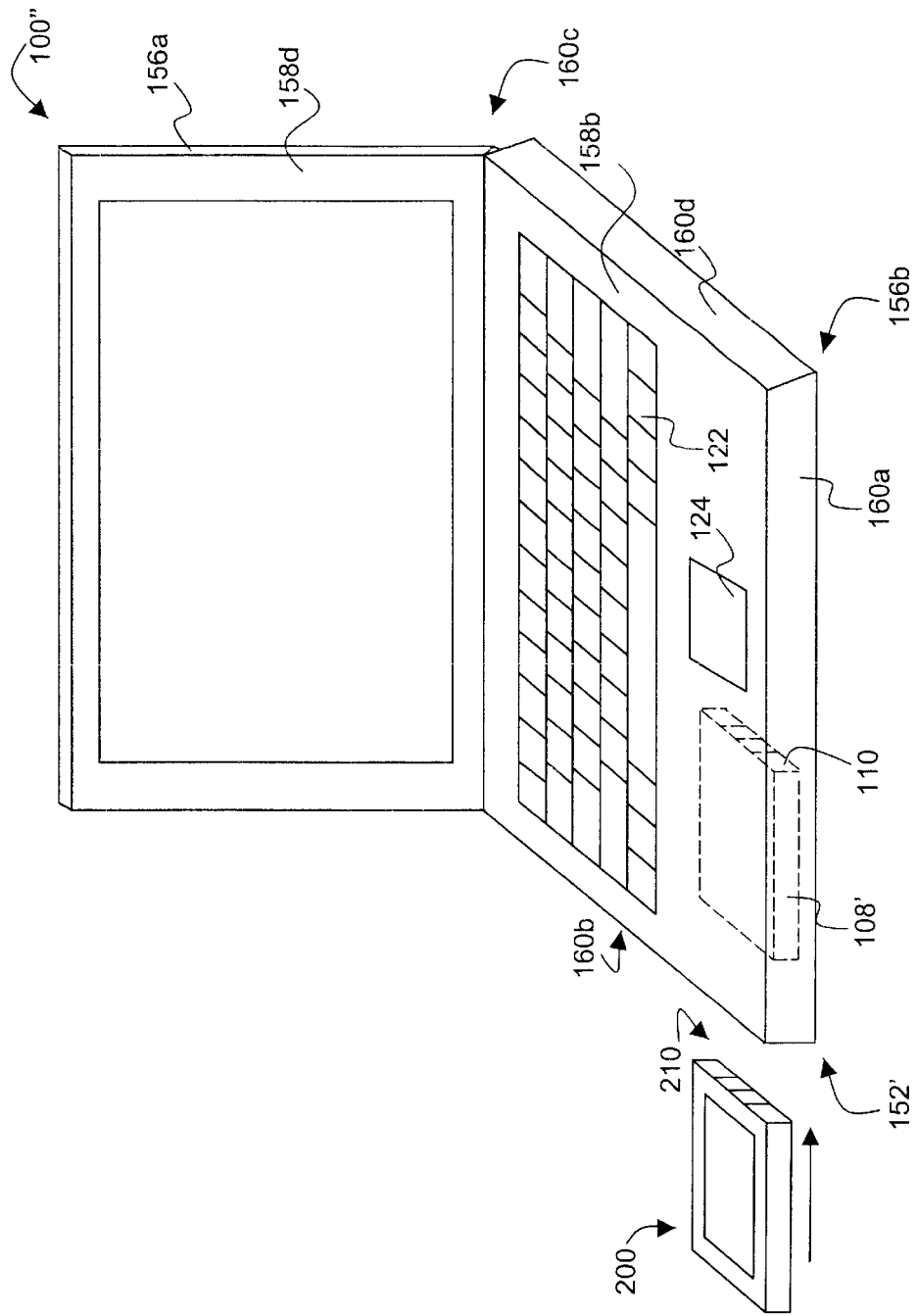
FIG. 7 illustrates a perspective view of the display device of the present invention in accordance with yet another embodiment.

FIG. 7 illustrates display device 100" of the present invention in accordance with yet embodiment. Again, display device 100" is similarly constituted as display device 100, except it is also provided with keyboard 122 and cursor control device 126. Furthermore, display device 100" has a form factor of a notebook computing device. However, for ease of understanding, the apparatus will continue be referred to as a "display device". Flat panel display 114 is disposed on interior surface 158a of top half 156a, whereas keyboard 122 and cursor control device 124 are disposed on interior surface 158b of bottom half 156b. Docking station 108' is exposed through opening 152' disposed on left side wall 160b. In alternate embodiments, docking station 108' may be exposed through opening 152' disposed on front, back or right side wall 160a, 160c or 160d.

Figure 8:
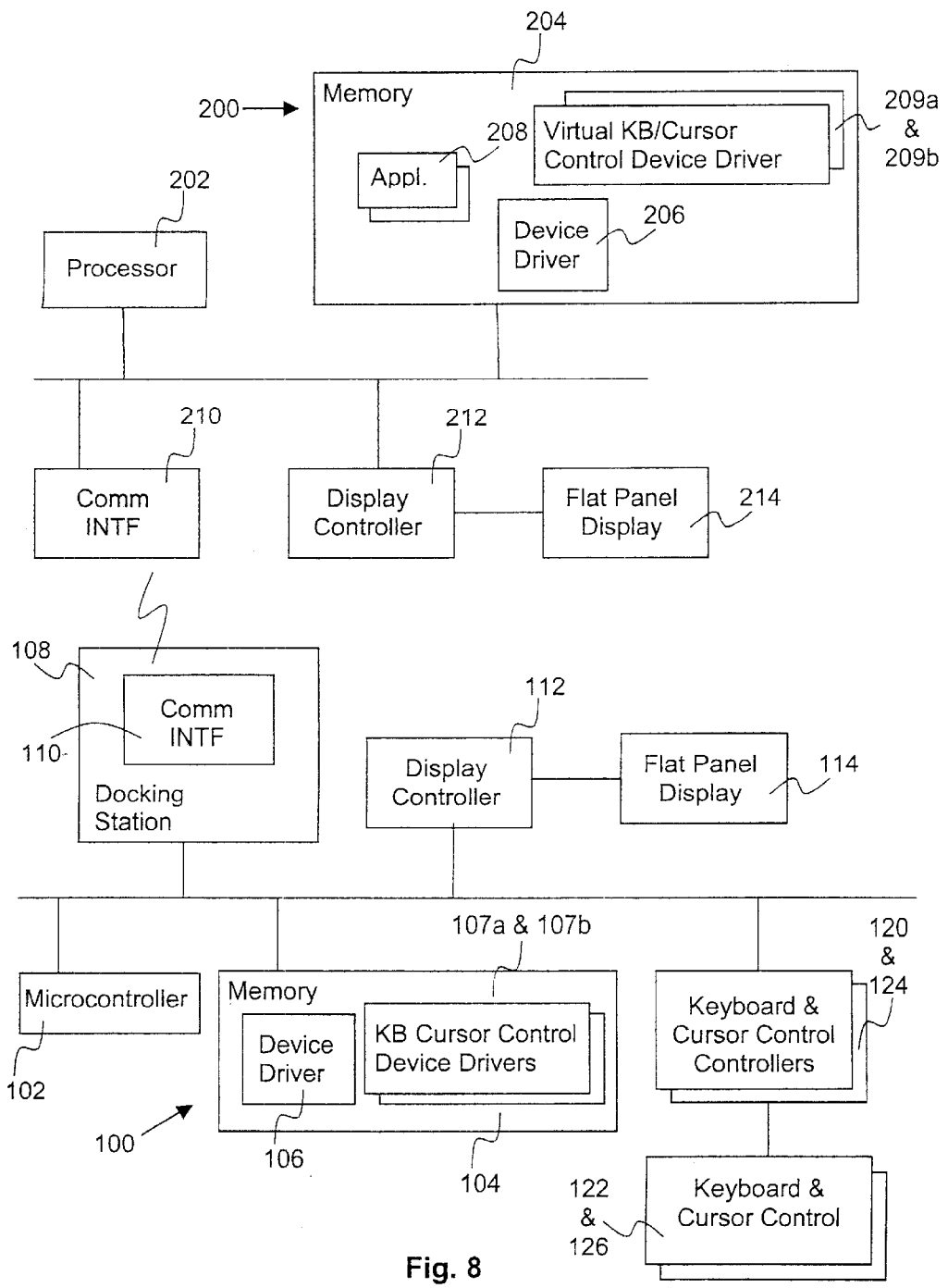
FIG. 8 illustrates an architectural view of the display device and a removably coupled palm sized computing device, in accordance with yet another embodiment each.

FIG. 8 illustrates an architectural view of display device 100" of FIG. 7 and computing device 200" in accordance with yet another embodiment each. As illustrated, display device 100", in addition to the earlier mentioned keyboard 122 and cursor control device 126, is further provided with keyboard and cursor device controllers 120 and 124, and corresponding device drivers 107a and 107b. During operation, device drivers 107a and 107b correspondingly control operations of keyboard 122 and cursor control device 126 through controllers 120 and 124. Keyboard 122 and cursor control device 126, their corresponding controllers 120 and 124 and device drivers 107a–107b may be any one of a number of these elements known in the art.

Computing device 200" is similarly constituted as computing device 200, except computing device 200" is further provided with corresponding virtual keyboard and cursor control device driver stubs 209a and 209b. Applications 208 needing access to either keyboard 122 or cursor control device 126 (e.g. "locking" the device) call a corresponding one of keyboard/cursor control device driver stubs 209a or 209b as if it is an actual keyboard/cursor control device driver corresponding to an actual keyboard/cursor control of computing device 200". Virtual keyboard/cursor control device driver stub 209a/209b redirects the service calls to device driver 206 for processing.

Figure 9A:
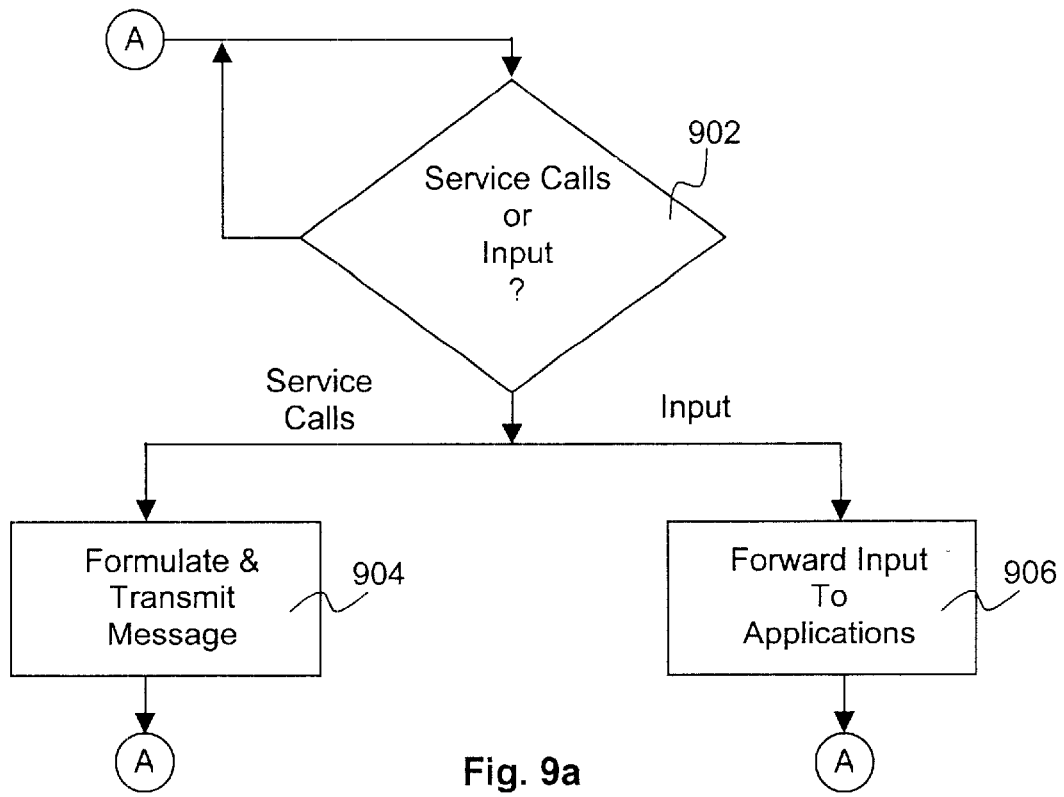
FIGS. 9a–9b illustrate the further operational flow of the device drivers of FIG. 8 in accordance with one embodiment.
Figure 9B:
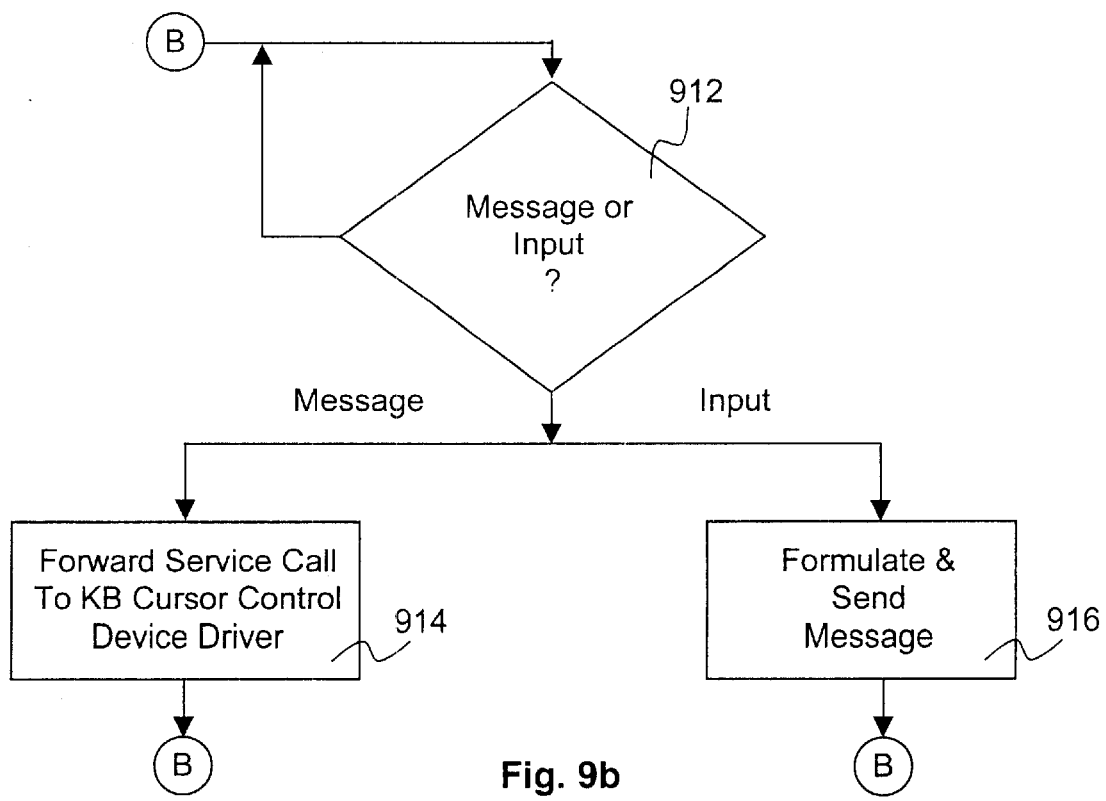

FIGS. 9a–9b illustrate the further operational flow of device drivers 206 and 106 of FIG. 8, in accordance with one embodiment each. As illustrated in FIG. 9a, at 902, device driver 206 monitors for service calls redirected from virtual keyboard/cursor control device driver stub 207a/207b as well as keyboard/cursor control inputs from device driver 106. Upon detection of the former, at 904, device driver 206 formulates and transmits a message to device driver 106 informing device driver 106 of the service call (including the call parameters, if any), if computing device 200" is coupled to display device 100". Otherwise, device driver 206 returns an error to applications 208. On the other hand, if the latter was detected instead, at 906, device driver 206 forwards the keyboard/cursor control inputs to an appropriate one of applications 208. Over in display device 100", as illustrated by FIG. 9b, at 912, device driver 106 awaits for messages from device driver 206 or inputs from keyboard/cursor control device 122/124. Upon receipt of the former, at 914, device driver 106 forwards the service call (including the call parameters, if any) to an appropriate one of keyboard/cursor control device 122/124 for processing. On the other hand, if the latter was detected instead, at 916, device driver 106 formulates and transmits a message to device driver 106 informing device driver 206 of the keyboard/cursor control inputs.

Accordingly, it can be seen, from the foregoing description, a user may be provided with more flexibility on interacting with applications executing on computing device 200" using input devices otherwise not available on computing device 200", through display device 100" of the present invention. Of course, the user experience may be even further enhanced by further extending display device 100" with one or more of the I/O peripherals of earlier described display device 100'. An example usage of display device 100" is to transform a user's computing device 200" into e.g. a notebook computer, thereby eliminating the need for the user to own and pay the full cost of both devices, while allowing the user to maintain the flexibility and freedom to keep a number of applications and data on the smaller form factor computing device.

Thus, a display device having an integral docking station for a palm sized computing device has now been described. While the display device of the present invention has been described in terms of the above illustrated embodiments, those skilled in the art will recognize that the present invention is not limited to the embodiments described. The present invention may be practiced with modification and alteration within the spirit and scope of the appended claims. The above description is thus to be regarded as illustrative instead of restrictive on the present invention.

What is claimed is:

1. A display device comprising:
a flat panel display;
a display controller coupled to said flat panel display to control said flat panel display;
a microcontroller coupled to the display controller to control the display controller;
a docking station including a communication interface coupled to the microcontroller to facilitate removable coupling of a palm sized computing device to the display device to allow said flat panel display to be used in conjunction with said palm sized computing device for an application executing on said palm sized computing device, with the palm sized computing device driving said microcontroller and in turn said display controller; and
a chassis integrally housing said flat panel display, said display controller, said microcontroller and said docking station, wherein the flat panel display device is a touch sensitive flat panel display device, and the display controller includes logic to communicate user interactions with the flat panel device to said microcontroller, to facilitate user inputs to said application executing on said palm sized computing device using said touch sensitive flat panel display device.

2. The display device of claim 1, wherein said chassis has a form factor of a tablet with the touch sensitive flat panel display disposed on an externally exposed front surface, and includes an opening disposed on a side wall exposing said integrally included docking station to facilitate said removable coupling of the palm sized computing device.

3. The display device of claim 2, wherein the side wall is a selected one of a top, a bottom, a left and a right side wall.

4. The display device of claim 2, wherein the chassis further includes a transparent window making an integral display of said palm sized computing device visible.

5. The display device of claim 1, wherein the display device further includes an input device selected from a group consisting of a keyboard and a cursor control device, and an input device controller coupled to said input device and said microcontroller, to facilitate user inputs to said application executing on said palm sized computing device using said input device.

6. The display device of claim 5, wherein said chassis has a form factor of a notebook computing device with the flat panel display and the input device disposed on an interior surface each of a top and a bottom half respectively, and said chassis includes an opening disposed on a side wall of the bottom half exposing said integrally included docking station to facilitate said removable coupling of the palm sized computing device, and said provision of user inputs to said application executing on said palm sized computing device using said input device.

7. The display device of claim 6, wherein the side wall is a selected one of a front, a back, a left and a right side wall.

8. The display device of claim 1, wherein the display device further includes a removable media storage device, and a removable media storage device controller coupled to said removable media storage device and said microcontroller, to facilitate at least access to data stored on a removable medium by said application executing on said palm sized computing device, with the palm sized computing device driving said microcontroller, and in turn said removable media storage device controller.

9. The display device of claim 8, wherein the removable media storage device is a storage device selected from a group consisting of diskette drive, a CDROM drive and a DVDROM drive, the display device further includes at least one speaker coupled to the removable media storage device controller which also controls audio output on said at least one speaker, to facilitate output of audio data stored on said removable medium accessed by said application executing on said palm sized computing device.

10. The display device of claim 1, wherein the display device further includes a second communication interface, and a communication interface controller coupled to said second communication interface and said microcontroller, to facilitate access to remote data by said application executing on said palm sized computing device, with the palm sized computing device driving said microcontroller, and in turn said second communication interface controller.

11. A display device comprising:
a flat panel display;
a display controller coupled to said flat panel display to control said flat panel display;
an input device selected from a group consisting of a keyboard and a cursor control device;
an input device controller coupled to the input device to control the input device;
a microcontroller coupled to the display controller and the input device controller to control the display controller and the input device controller;
a docking station including a communication interface coupled to the microcontroller to facilitate removable coupling of a palm sized computing device to the display device to allow said flat panel display and said input device to be used in conjunction with said palm sized computing device for an application executing on said palm sized computing device, with the palm sized computing device driving said microcontroller and in turn said display controller and said input device controller; and
a chassis integrally housing said flat panel display, said display controller, said microcontroller, said docking station, said input device, and said input device controller, said chassis having a form factor of a notebook computing device with the flat panel display and the input device disposed on an interior surface each of a top and a bottom half respectively, and including an opening disposed on a side wall of the bottom half exposing said integrally included docking station to facilitate said removable coupling of the palm sized computing device, and provision of user inputs to said application executing on said palm sized computing device using said input device, wherein the display device further includes a second communication interface, and a communication interface controller coupled to said second communication interface and said microcontroller, to facilitate access to remote data by said application executing on said palm sized computing device, with the palm sized computing device driving said microcontroller, and in turn said second communication interface controller.

12. The display device of claim 11, wherein the display device further includes a removable media storage device, and a removable media storage device controller coupled to said removable media storage device and said microcontroller, to facilitate at least access to data stored on a removable medium by said application executing on said palm sized computing device, with the palm sized computing device driving said microcontroller, and in turn said removable media storage device controller.

13. The display device of claim 12, wherein the removable media storage device is a storage device selected from a group consisting of diskette drive, a CDROM drive and a DVDROM drive, and the display device further includes at least one speaker coupled to the removable media storage device controller which also controls audio output on said at least one speaker, to facilitate output of audio data stored on said removable medium accessed by said application executing on said palm sized computing device.

14. The display device of claim 11, wherein the chassis further includes a transparent window making an integral display of said palm sized computing device visible.

* * * * *

UNITED STATES PATENT AND TRADEMARK OFFICE
CERTIFICATE OF CORRECTION

PATENT NO. : 6,489,932 B1
DATED : December 3, 2002
INVENTOR(S) : Chitturi et al.

It is certified that error appears in the above-identified patent and that said Letters Patent is hereby corrected as shown below:

<u>Title page,</u>
Item [56], References Cited, U.S. PATENT DOCUMENTS,
"6,163,326 A  *   4/2000" should read -- 6,163,326 A  *    12/2000 --.

<u>Column 1,</u>
Line 58, "result, a need exist" should read -- result, a need exists --.

<u>Column 2,</u>
Line 14, "display devcie" should read -- display device --.

<u>Column 4,</u>
Lines 43-44, "controller (s)" should read -- controller(s) --.

<u>Column 7,</u>
Lines 38 and 57, "device of claim 1" should read -- device of claim 2 --.

<u>Column 8,</u>
Line 8, "device of claim 1" should read -- device of claim 2 --.

Signed and Sealed this

Eighteenth Day of April, 2006

JON W. DUDAS
*Director of the United States Patent and Trademark Office*